Jan. 13, 1959  W. E. BOUNDS  2,868,958
PHOTOGRAPHIC FLASH APPARATUS
Filed Oct. 7, 1954  4 Sheets-Sheet 1
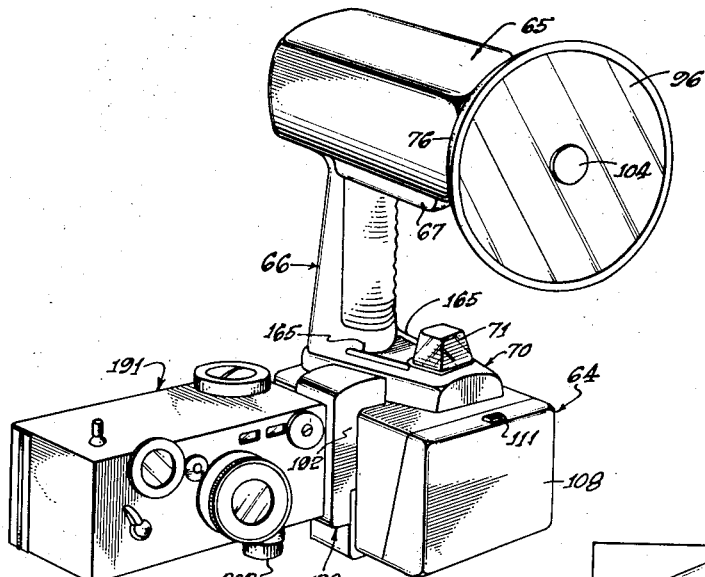
Fig. 1.
Fig. 14.
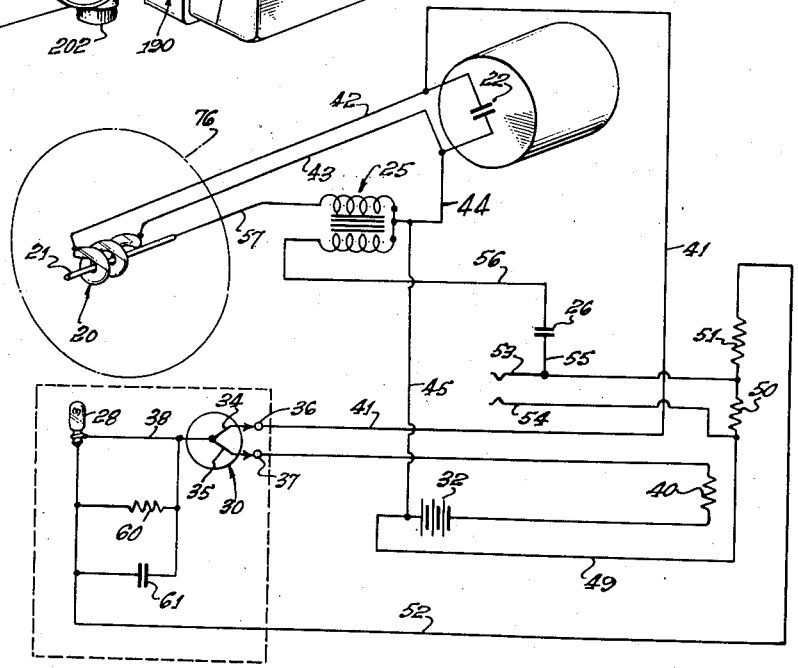
WILLIAM E. BOUNDS,
INVENTOR.
BY Jess M. Roberts
ATTORNEY.

Jan. 13, 1959 W. E. BOUNDS 2,868,958
PHOTOGRAPHIC FLASH APPARATUS
Filed Oct. 7, 1954 4 Sheets-Sheet 2
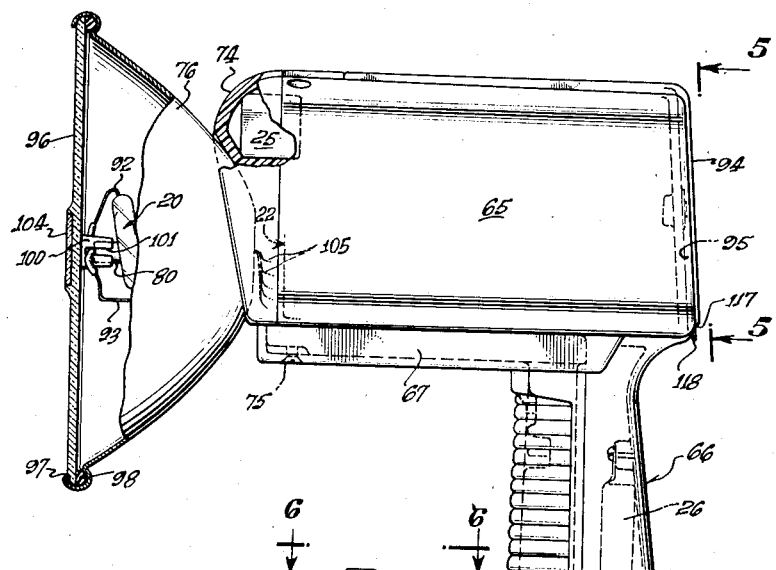
FIG. 2.
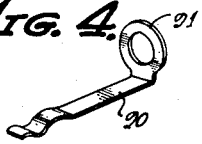
FIG. 4.
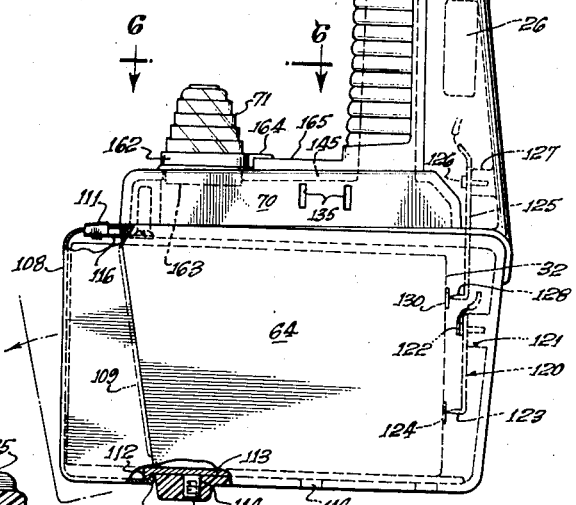
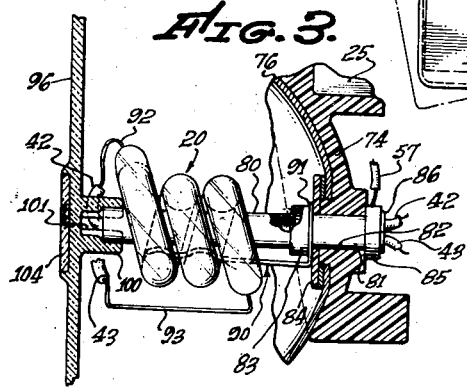
FIG. 3.
WILLIAM E. BOUNDS,
INVENTOR.
BY
Jes6M Roberts
ATTORNEY.

Jan. 13, 1959  W. E. BOUNDS  2,868,958
PHOTOGRAPHIC FLASH APPARATUS
Filed Oct. 7, 1954  4 Sheets-Sheet 3

WILLIAM E. BOUNDS,
INVENTOR.

BY
ATTORNEY.

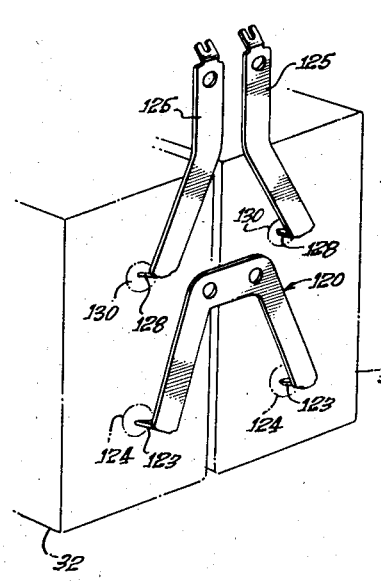
Jan. 13, 1959   W. E. BOUNDS   2,868,958
PHOTOGRAPHIC FLASH APPARATUS
Filed Oct. 7, 1954   4 Sheets-Sheet 4
WILLIAM E. BOUNDS,
INVENTOR.
BY
Jacob Roberts
ATTORNEY.

United States Patent Office 2,868,958
Patented Jan. 13, 1959

2,868,958

PHOTOGRAPHIC FLASH APPARATUS

William E. Bounds, Hermosa Beach, Calif., assignor to Limelite Corporation, Los Angeles, Calif., a corporation of California Application October 7, 1954, Serial No. 460,966

9 Claims. (Cl. 240—1.3)

This invention relates to photographic flash apparatus incorporating a gaseous discharge flash lamp and is directed to a self-contained portable unit of this character.

One broad object of the invention is to provide a flash apparatus of exceptionally light weight and of exceptional compactness such that the whole apparatus may be embodied in a single piece of equipment adapted for mounting directly on a hand-held camera. In this regard one purpose of the invention is to provide a combination of electrical components that will make possible such a light compact unit and a still further object is to arrange the components to provide a unit configuration that is highly functional as well as convenient to handle.

In general this broad object is attained by an improved circuit for the purpose that requires only a relatively small battery and incorporates a highly efficient main capacitor in roll form. The self-contained unit is in a single housing that may be easily held in one hand, the invention completely eliminating the usual separate battery case carried by a shoulder strap. The housing of the self-contained unit has a lower longitudinal portion to contain the battery and an upper longitudinal portion spaced therefrom to contain the main capacitor, these two housing portions being interconnected by an intermediate upright housing portion that serves as a convenient handle for the unit. A special feature of the invention is the concept of providing such a self-contained unit in a single housing made of non-conducting material thus making it possible to completely isolate the electrical system in the housing. With the electrical system safely isolated in this manner it becomes possible to keep the main capacitor normally charged. It is desirable to keep the main capacitor at least partially charged and for this purpose it is a common expedient to provide a trickle of current to the capacitor through suitable resistance. The present invention eliminates the need for such resistance and avoids the problem that arises when such a resistance fails to serve its purpose.

With reference to compactness and simplicity of structure, a further feature of the invention is the use of an indicator lamp in combination with a normally open switch for electrically isolating the main capacitor from the battery. In this regard the invention is characterized by a compact switch manually operated by a knob or handle means with the indicator lamp housed therein. In the preferred practice of the invention the indicator lamp is a neon lamp incorporated in an indicator circuit that causes the lamp to blink when the flash unit is readied for operation.

Another broad object of the invention is to provide a method and means of mounting a coiled gaseous discharge lamp on the unit for maximum illumination, with the emitted light of a quality desirable for color photography. To this end a suitable support member is mounted in the reflector of the unit at a location at least approximately at the axis of the reflector and the lamp coil is mounted on this support with the axis of the coil also at least approximately at the axis of the reflector. Preferably the support is in the form of a highly polished metal tube with the wiring for the lamp coil extending longitudinally through the tube. The light-reflecting polish of the support tube adds to the effectiveness of the reflector and since the support tube is made of metal it is given the further function of serving as the trigger grid for the gaseous discharge lamp.

A special feature of the invention is the concept of employing yielding means to maintain the coiled gaseous lamp in pressure contact with the support tube. In the preferred practice of the invention a suitable leaf spring extends into the lamp coil to urge the lamp coil in one lateral direction thereby to press the lamp coil against one side of the support tube. This arrangement serves the dual purpose of insuring effective contact between the lamp coil and the trigger grid and of eliminating vibration of the lamp tube relative to the rest of the unit. The leaf spring causes the lamp coil to make effective contact with the support tube at at least two points and in the preferred practice of the invention the leaf spring is electrically connected with the support tube so that the leaf spring itself functions as part of the trigger grid and provides at least one additional point of contact between the lamp tube and the grid.

In the preferred practice of the invention a suitable guard in the form of a transparent or translucent plate spans the reflector. In this regard the invention is characterized by the concept of such a guard serving multiple purposes. One of these purposes is to brace or reinforce the outer end of the support tube for the gaseous discharge lamp. To this end the guard plate is adapted to engage the outer end of the tube. Another purpose which constitutes an important feature of the invention is to support a relatively small colored filter for modifying the emitted light. In the present practice of the invention, for example, a red translucent disc is mounted centrally on the guard plate. Although the colored disc is relatively small, its area being only a fraction of the area of the reflector, it affects the illumination of the whole scene.

A further feature of the preferred embodiment of the invention is the provision of a built-in exposure calculator. In the present embodiment of the invention the exposure calculator comprises two scale members, namely, an outer fixed scale member integral with the unit housing, and an inner rotary scale member. The outer scale member has at least one straight slot with camera aperture settings along the edge of the slot and the inner scale member has a plurality of distance scales for registration with the slot selectively. In addition, the inner scale has a plurality of indices representing different types of films or different film speeds and these indices register with a window in the outer fixed scale member. Thus rotating the inner scale member to a position where a given film speed rating appears at the window of the outer scale member results in the appearance of the corresponding distance scale at the aforementioned slot adjacent the distance scale.

The features and advantages of the invention will be readily understood from the following detailed description considered with the accompanying drawings.

In the drawings, which are to be regarded as merely illustrative:

Fig. 1 is a perspective view of the presently preferred embodiment of the invention mounted on the side of a small hand-held camera;

Fig. 2 is an enlarged side elevation of the unit with portions broken away to reveal concealed structure;

Fig. 3 is an enlarged sectional detail showing the manner in which the gaseous discharge lamp is mounted in the reflector;

Fig. 4 is a perspective view of a leaf spring shown in Fig. 3;

Fig. 9 is an exploded view of a switch assembly and associated components employed in the preferred embodiment of the invention;

Fig. 10 is a schematic view in perspective indicating the manner in which contact elements are mounted inside the housing for connecting the batteries into the circuit;

Fig. 11 is a perspective view of an adapter bracket that is shown in Fig. 1;

Fig. 12 is a fragmentary plan view of an element of the switch assembly shown in Fig. 9;

Fig. 13 is an enlarged sectional detail taken as indicated by the line 13—13 of Fig. 12; and Fig. 14 is a schematic wiring diagram of the circuitry of the invention.

Figure 5:
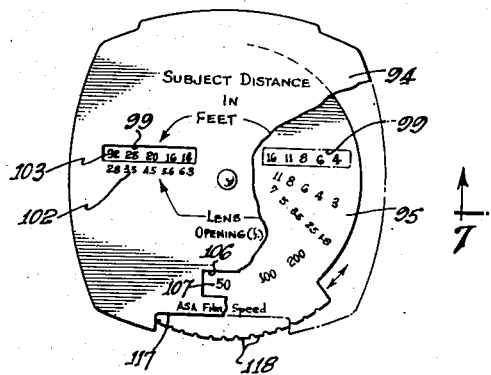
Fig. 5 is a face view of the exposure calculator on the rear of the unit.

The present embodiment of the invention may be considered as built around a circuit shown diagrammatically in Fig. 14. The principal components of this circuit include: a gaseous discharge flash lamp 20 having the form of a helically coiled glass tube; a grid 21 to trigger the electric discharge of the lamp; a main capacitor 22 to store electrical energy for energizing the flash lamp; a trigger transformer, generally designated by numeral 25, for energizing the grid 21; a trigger capacitor 26; an indicator lamp 28; a normally open switch, generally designated by numeral 30, for readying the circuit in preparation for firing the flash lamp; and a battery means 32.

The switch 30 has two interconnected arms 34 and 35 which cooperate with corresponding fixed contacts 36 and 37, respectively, and which are in continuous electrical communication with one side of the lamp 28 as indicated by the conductor 38 in the wiring diagram. When the switch 30 is in its normal open position it isolates the two contacts 36 and 37 from each other and also isolates one side of the lamp 28. When the switch is in its closed position it not only interconnects the two fixed contacts 36 and 37 but also connects both contacts with one side of the indicator lamp 28.

One side of the battery 32 is connected through a limiting resistor 40 to the contact 37 and the contact 36 is connected to one side of the main capacitor 22 by wires 41 and 42. Wire 42 connects the same side of the main capacitor 22 with one terminal of the gaseous discharge lamp 20, the other side of the main capacitor being connected to the other terminal of the gaseous discharge lamp by a wire 43. The circuit for charging of the main capacitor 22 by the battery 32 is completed by a wire 44 together with a wire 45, the wire 45 being connected to the second side of the battery.

The battery 32 is connected by a wire 49 with two resistors 50 and 51 in series and the two resistors in turn are connected to the second side of the indicator lamp 28 by a wire 52. The circuit includes what may be termed a pair of synchronizing contacts 53 and 54 which may be regarded as constituting a firing switch since they are adapted for releasable connection with the opposite sides, respectively, of a synchronizing firing switch incorporated in or controlled by the camera shutter mechanism. These two synchronizing contacts are connected to opposite ends of the resistor 50.

The synchronizing contact 53 is connected by a wire 55 with one side of the trigger capacitor 26 and the other side of the trigger capacitor is connected to the primary coil of the trigger transformer 25 by a wire 56. The secondary coil of the trigger transformer 25 is connected by a wire 57 with the trigger grid 21, the other ends of the two transformer coils being both connected to the previously mentioned wire 44. Preferably the indicator lamp 28 is a neon lamp in an indicator network that includes a resistor 60 and a capacitor 61, both of which shunt the indicator lamp.

Upon analysis it can be seen that a number of portions of the described circuit are in parallel with the battery 32. Thus both the main capacitor 22 and the gaseous discharge lamp 20 are in parallel, being connected to opposite terminals of the battery. The indicator lamp 28 and, in fact, the whole indicator network may be considered as in parallel with the battery. The three resistors 40, 50 and 51 are in series with the battery, but the resistor 50 is in parallel both with the pair of synchronizing contacts 53 and 54 and with what may be termed a trigger circuit comprising wire 45, the primary coil of the trigger transformer 25, wire 56, trigger capacitor 26 and wire 55.

The manner in which the circuit in Fig. 14 operates for its purpose may be readily understood. When the switch 30 is changed from its normal open position to the closed position indicated in the wiring diagram, the battery 32, being in parallel with the main capacitor 22, charges the main capacitor and at the same time the trickle of current through the resistor 50 creates a potential drop that results in charging of the trigger capacitor 26. A voltage drop also develops across the resistor 60 to charge the capacitor 61 but this capacitor is periodically discharged by the neon lamp 28. Thus the neon lamp continually blinks to indicate that switch 30 is closed with the circuit ready for firing the gaseous discharge lamp 20.

When the circuit is closed through the two synchronizing contacts 53 and 54 by closing of the synchronizing switch in the camera mechanism, the charge on the trigger capacitor 26 is discharged through the primary coil of the trigger transformer 25 thereby causing the secondary coil of the trigger transformer to energize the trigger grid 21. Energization of the trigger grid 21 causes the gaseous discharge flash lamp 20 to fire, i. e., causes the gas therein to ionize to form a conducting path for discharge of the main capacitor 22. The main capacitor 22 immediately recharges to ready the circuit for repetition of the firing cycle.

A feature of the invention, as will be apparent, is the use of a single housing for the self-contained unit, which housing is made of nonconducting material, with all of the described circuit components completely enclosed. Since none of the components are exposed outside of the housing and since no conductors of the described circuit extend out of the housing, the main capacitor 22 may be normally in charged state. When switch 30 is opened the main capacitor 22 is already charged and the opening of the switch isolates one side of the charged capacitor from the battery. It is also to be noted that when switch 30 is open, one side of the indicator network is isolated from the battery and, moreover, the circuit through the series of resistors is broken to prevent drain on the battery and to leave a charge on the trigger capacitor 26.

As best shown in Figs. 1 and 2, the present embodiment of the self-contained unit is enclosed by a housing of non-conducting plastic material, which housing comprises a lower longitudinal portion, generally designated by numeral 64, an upper longitudinal housing portion, generally designated by numeral 65, and an intermediate housing portion 66 which interconnects the upper and lower housing portions and which serves as a convenient handle for the unit. In this particular practice of the invention the intermediate handle portion 66 of the housing is unitary with a bottom wall 67 of the upper housing portion 65 and is also integral with a forwardly extending hollow wall that forms a shallow compartment 70 on the upper side of the lower housing portion 64. The shallow compartment 70 encloses the previously mentioned switch 30, which switch may be manually operated by a rotary knob 71.

The front end of the upper housing portion 65 is closed by an end wall 74 suitably attached thereto by screws 75 (Fig. 2) and this end wall carries the usual forwardly directed reflector 76 in which the gaseous discharge flash lamp 20 is mounted. As best shown in Fig. 3 the gaseous discharge lamp 20 comprises a glass tube formed into a helical coil and this coiled glass tube is preferably mounted on a support in the form of a rigid metal tube 80.

In the construction shown, the support tube 80 has a base portion 81 which extends through a bore 82 in the end wall 74. Preferably the support tube is formed with a circumferential shoulder 83 which backs against a resilient gasket 84, the support tube being held in its assembled position by a suitable metal collar 85. The metal collar 85 is backed against the inner side of the end wall 74, the inner end of the support tube being peened over the collar as indicated at 86 in Fig. 3. As heretofore stated, a feature of the invention is the use of such a support tube to serve as a grid for triggering the gaseous discharge lamp 20. The previously mentioned wire 57 of the circuit may be soldered to the metal collar 85 for this purpose.

In the preferred practice of the invention the coiled gaseous discharge lamp 20 is mounted on the support tube 80 by means of a suitable leaf spring 90. The leaf spring 90 has a ring-shaped base 91 which embraces the base portion 81 of the support tube as shown in Figure 3. The leaf spring 90 extends into the interior of the coiled gaseous discharge lamp 20, as shown in Fig. 3, and urges the lamp laterally to create pressure contact between the support tube 80 and at least two turns of the lamp coil. Since the leaf spring 90 is in electrical communication with the support tube 80 it functions as part of the trigger grid and for this purpose makes pressure contact with the coiled gaseous discharge lamp.

It will be noted that a considerable portion of the peripheral surface of the support tube 80 is exposed. It is contemplated that this exposed surface of the support tube will be highly polished to reflect light with high efficiency thereby to increase the effectiveness of the reflector 76. As shown in Fig. 3, preferably the two wires 42 and 43 of the previously described circuit are covered with insulation and both extend through the length of the support tube 80. The outer ends of the two wires are connected to the corresponding leads 92 and 93 at the two ends of the gaseous discharge lamp 20.

In the preferred practice of the invention the reflector 76 is covered by a guard plate 96 of suitable transparent or translucent material, preferably a suitable plastic material. For this purpose the rim of the reflector 76 is shaped to form a groove 97 to receive the peripheral edge of the guard plate 96, the guard plate being backed against a suitable ring 98 of rubber-like material. In the construction shown this guard plate 96 engages and braces the outer end of the support tube 80 and for this purpose a suitable socket member 100 is mounted on the inner face of the guard plate in telescopic engagement with the outer end of the support tube. The socket member 100 is formed with two diametrically opposite slots 101 to clear the two wires 42 and 43.

The preferred practice of the invention includes a relatively small disc 104 of colored translucent material mounted on the guard plate 96 in a central position to intercept a minor portion of the emitted flash illumination. The disc 104 is suitably colored to cooperate with the gaseous discharge lamp 20 to produce light that is balanced or of desirable quality for flashlight photography. In this instance the disc 104 is of relatively strong red color. It has been found that a relatively small deeply colored translucent disc mounted in this general manner will cast a relatively weak hue over the scene to compensate for the fact that the light emitted by the gaseous discharge tube 20 is predominantly blue in character. The portion of light that actually passes through the disc 104 is, of course, colored deep red, but this colored light is distributed over the whole scene and is combined with many times as much clear or unfiltered light. Thus the effect of a relatively small strongly colored disc is similar to the effect of a weakly hued filter covering the whole area of the reflector 76.

The previously mentioned trigger transformer 25 is nested into the forward end of the upper housing portion 65, as indicated in Fig. 2, and the remainder of the upper housing portion is occupied by the relatively large main capacitor 22. The main capacitor 22 is of a well known electrolytic type comprising two sheets of conducting material and an intermediate layer of dielectric material, the three layers being rolled into the form of a solid cylinder. In this regard, a feature of the invention is the concept of tapping numerous turns of one of the conducting sheets by means of short metallic strips 105 attached thereto, all of the strips 105 being electrically connected to the previously mentioned wire 42 that leads to one terminal of the gaseous discharge lamp 20. Thus the strips 25 form numerous paths for current flow on one side of the main capacitor, thereby cutting down the resistance to the flow of current when the main capacitor discharges through the gaseous discharge lamp 20. It will be noted that the resistance to current flow is further reduced by the close coupling of the main capacitor with the gaseous discharge lamp. The reduction in resistance, of course, appreciably increases the efficiency of the unit.

The rear end of the upper housing portion 65 is preferably provided with a built-in exposure calculator as shown in Fig. 5. The calculator comprises a first fixed outer scale member 94 and a second inner rotary scale member 95. The outer fixed scale member 94, which may be considered as a fixed wall portion of the housing, has at least one slot therein to permit a scale of distance values on one of the two members to be correlated with a scale of camera aperture settings on the other member. Fig. 5 shows two diametrical slots 99 along the margins of which is placed a scale 102 of camera aperture settings. The inner rotary scale member 95 is provided with a plurality of distance scales 103 which may be registered selectively with the slots 99 for use with the camera aperture scale 102.

Means is provided for guidance in the selection of the rotary position of the inner scale member 95 in accord with the sensitivity ratings of different films. For this purpose the outer fixed scale member 94 may have a window 106 therein and the inner rotary scale member may be provided with a plurality of indices 107 representing the ratings of different films. The lower edge of the outer fixed scale member 94 may be recessed as shown at 117 to expose a marginal portion of the rotary scale member 95 to permit convenient manipulation of the rotary scale member. Preferably the margin of the rotary scale member is formed with serrations 118 for further convenience in manual manipulation. Preferably slight frictional resistance to rotation of the inner scale member is provided, the frictional resistance being of such degree as to permit the inner scale member to be rotated manually but, nevertheless, to tend to maintain the rotary scale member at any rotary position at which it may be adjusted. It is apparent that the user need merely manually rotate the inner scale member 95 until the film rating index appearing at the window 106 is the rating of the film in the camera. The distance scale then appearing in the two slots 99 will provide guidance as to the aperature setting of the camera to be used for the given distance from the camera to the subject.

The lower longitudinal housing portion 64, which is of boxlike configuration, preferably has a removable end or closure member 108. The closure member 108 engages a flange 109 (Fig. 2) on each side of the housing and is held in place by a hook 110 at the bottom of the closure member in cooperation with a latch 111 at the top. The hook 110 on the lower end of the closure member 108 engages an overhanging flange 112 of a fixed plate 113. The plate 113, which serves as a liner for the bottom of the housing, is formed with legs 114 that seat in corresponding recesses in the bottom housing wall, the plate being anchored by suitable screws 115.

The latch 111 comprises a block of material mounted on a leaf spring 116 which body is normally positioned in a corresponding aperture in the closure member 108. It is apparent that the closure member 108 may be removed simply by depressing the latch 111 out of engagement with the aperture in the closure member and then swinging the closure member downward, as indicated by the arrow, to disengage the hook 110 from the flange 112.

The lower housing portion 64 is adapted to receive a pair of batteries 32 and is provided with suitable contacts for connecting the batteries into the described circuit. In this regard a feature of the invention is the provision of pointed spring contacts in the rear end of the housing for cooperation with the batteries 32 as shown in Figs. 2 and 10.

A U-shaped contact member 120 is mounted on a lug 121 of the housing by suitable screws 122 with the two legs of the contact member free to flex rearward. Each of the legs terminates in a forwardly directed sharply pointed prong 123 which is positioned to register with a terminal 124 of the corresponding battery 32. Thus when the two batteries 32 are forced longitudinally into the lower housing portion 64 the U-shaped contact member automatically makes contact with the terminals 124 to interconnect the two batteries electrically. In like manner a pair of angular contact members 125 made of spring metal are mounted by screws 126 on a lug 127 in the handle portion 66 of the housing. Each of the angular contact members extends downwardly and terminates in a forwardly directed sharply pointed prong 128 which registers with a terminal 130 of the corresponding battery 32.

When a pair of batteries 32 is to be replaced, the new pair is inserted to make initial light contact with the prongs 123 and 128 of the contact members but the two batteries are not forced to their limit positions. The closure member 108 is then hooked under the flange 112 so that the hook 110 may serve as a fulcrum with the closure member acting as a lever to force the two batteries 32 to their limit positions in opposition to the contact members 120 and 125. Thus when the closure member is moved to its fully closed position and automatically engaged by the latch 111, the contact members 120 and 125 will be stressed to substantial degree for permanent pressure contact between the prongs and the battery terminals. In this way the invention insures that the pointed prongs 123 and 128 will penetrate any protective material that may exist at the battery terminals.

Figure 7:
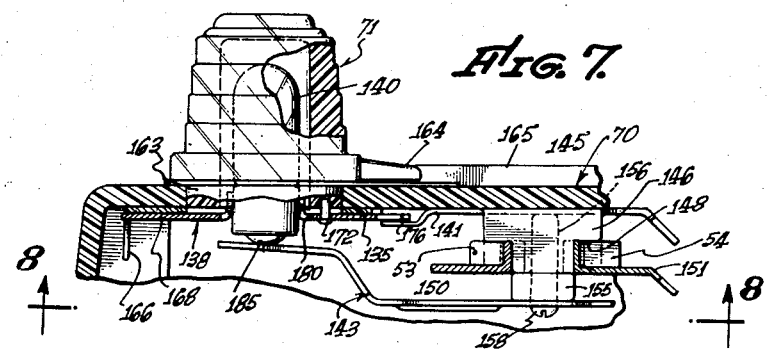
Fig. 7 is an enlarged fragmentary section taken as indicated by the line 7—7 of Fig. 8.
Figure 8:
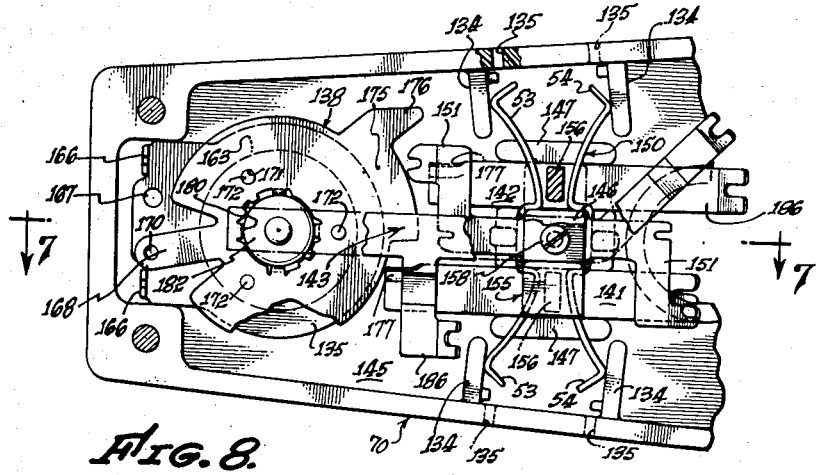
Fig. 8 is a section looking upward taken as indicated by the line 8—8 of Fig. 7.

As best shown in Figs. 7 and 8, the shallow compartment 70 on the upper side of the lower housing portion 64 not only encloses the switch 30 but also encloses two pairs of synchronizing contacts in parallel, each pair comprising a contact 53 and a contact 54, as heretofore described. Each of the two pairs of synchronizing contacts is flanked by a pair of housing ribs 134 and is adjacent a corresponding pair of receptacle slots 135. Thus the compartment 70 serves as a female outlet receptacle into which connecting plugs may be inserted from either side in a well known manner.

As shown in Fig. 9 the component parts of the switch 30 include: the previously mentioned operating knob 71; a fixed switch ring 136; a rotary switch member 138 that is adapted to receive a neon lamp bulb 140; a pair of fixed contact members 141 and 142; and a lower contact member 143. The two fixed contact members 141 and 142, which are metal strips, are seated against the upper wall 145 of the shallow compartment 70 on opposite sides of a central rectangular lug 146, each contact member lying between the central lug and a short longitudinal housing rib 147. The central rectangular lug 146 is reduced in cross section at its lower end to form a pair of shoulders 148 (Fig. 9) to receive a synchronizing contact assembly, generally designated by numeral 150. The synchronizing contact assembly 150 is made in two separate sections or halves, each section comprising two of the synchronizing contacts together with an angular terminal member 151 that is united therewith.

A clamping body 155 (Figs. 7 and 9) holds the two switch contact members 141 and 142 against the upper wall 145 and also holds the two sections of the synchronizing contact assembly 150 in position on the rectangular lug 146. For this purpose, the clamping body 155 has a pair of upwardly extending legs 156 that press against the two switch contacts and has a rectangular boss 157 that engages the synchronizing contact assembly. As best shown in Fig. 7, a suitable screw 158 anchors the clamp body 155 against the downwardly extending rectangular lug 146 and this screw passes through an aperture 160 (Fig. 9) in the lower contact member 143 to hold the lower contact member in assembled position. The switch knob 71 comprises a dome of transparent or semi-transparent material mounted on a base 162. The base 162 has a lower cylindrical projection 163 that rotatably seats in the fixed switch ring 136 and also has a horizontal finger 164 that extends over the outer surface of the upper wall 145.

Figure 6:
Fig. 6 is a fragmentary plan view of the lower longitudinal portion of the unit housing as seen along the line 6—6 of Fig. 2.

As shown in Fig. 6 the finger 164 has a limited range of movement between two ribs 165 on the outer wall of the shallow compartment 70, the finger being movable between an "off" position for the switch and an "on" position. The fixed switch ring 136 has two downwardly extending terminals 166 in the form of tongues and is formed with a pair of small offsets 167 to cooperate with a detent finger 168 on the rotary switch member 138. The finger 168 has a small offset 170 which serves as a detent button to releasably engage the offsets 167 of the fixed switch ring 136.

The rotary switch member 138 is in the form of a metal plate having three apertures 171 (Fig. 9) to receive suitable pins 172 (Fig. 7) for permanently attaching the plate to the base of the switch knob 71. The rotary switch member 138 has a first marginal portion 175 to cooperate with the fixed switch contact 141 and has a second marginal portion 176 of greater radial extent to cooperate with the second fixed contact member 142. In the closing action of the switch member, the two marginal portions 175 and 176 slide onto the two fixed contacts 141 and 142 with a wiping action that makes the switch self-cleaning to keep the cooperating metal surfaces bright. Preferably each of the fixed contact members 141 and 142 is formed with an inclined lip 177 in the path of the rotary switch member so that the rotary switch in closing causes each of the two switch contacts 141 and 142 to flex by a cam action. Such an arrangement insures a desirable degree of pressure between the cooperating parts.

The rotary switch member 138 has a central circular aperture 180 and is formed with a plurality of tongues extending upward from the aperture to embrace the base ferrule 182 of the neon lamp 140. The rotary switch member 138 is cut away at the margin of the circular aperture 180 to provide at least one pair of diametrically positioned recesses 183, each of which is narrower than the diameter of the two bayonet pins 184 of the neon lamp bulb 140. The neon lamp bulb is inserted into the circular aperture from below with the bayonet pins 184 engaging the recesses 183 from below as shown in Fig. 13. The lamp bulb is held in this position by upward pressure from the lower contact member 143 against the bottom axial contact 185 of the lamp bulb.

The remaining components of the circuit shown in Fig. 14 may be mounted in the shallow compartment 70 and in the handle portion 66 of the housing. Thus the resistors 51 and 60 together with the capacitor 61 may be mounted in the compartment 70 and the resistors 40 and 50 together with the capacitor 26 may be mounted in the handle portion 66 of the housing. The various parts shown in Fig. 9 will be suitably connected into the circuit. Thus the two downwardly extending tongues 166 of the fixed switch ring 136 will be connected to the resistor 60 and the capacitor 61, respectively, the other sides of these two components being connected to corresponding arms 186 of the lower contact member 143. The lower contact member 143 will be connected to one side of the resistor 51 and the other side of the resistor will be connected to the synchronizing contact assembly 150.

Fig. 1 shows how an adaptor bracket 190 may be attached to the lower housing portion 64 of the unit to permit the unit to be mounted on the side of a camera 191. As shown in Fig. 11, the adaptor bracket 190 is U-shaped and comprises a body 192 of non-conducting material united with a metal strap 193. The body 192 has a pair of prongs 194 to plug into one of the pairs of receptacle slots 135 and these two prongs are connected by concealed wires 195 with a pair of contact prongs 196 that enter the camera for cooperation with the synchronizing switch in the camera. When the adaptor bracket 190 is positioned on the lower housing portion 64, as shown in Fig. 1, apertures 199 register with screw holes (not shown) on the under side of the lower housing portion 64 to receive suitable attachment screws. A finger 200 from the metal strap 193 extends under the camera 191 and has a suitable aperture 201 to receive the usual thumb screw 200 by means of which the adaptor may be connected to the camera 191 in a conveniently releasable manner. It is apparent that with the unit mounted on the side of the camera 191, the handle 66 provided by the unit serves as a means for manual support of the camera in the taking of a picture.

My description herein of a selected embodiment of the invention by way of example to illustrate the principles involved will suggest various changes, substitutions and other departures from my disclosure within the spirit and scope of the appended claims.

I claim:

1. In a flash unit for synchronous operation with a camera, the combination of: a forwardly directed concave reflector; a generally horizontal elongated rigid support of conducting material mounted centrally in said reflector in a forwardly extending position approximately on the axis of the reflector; a guard of light-transmitting material spanning said reflector, the periphery of said guard being connected with said reflector and the central portion of said guard engaging the outer end of said support for reinforcement thereof; an elongated electric discharge flash lamp carried by said support and coiled around the support with a plurality of turns of the lamp coil in direct contact with the support, said support serving as a grid to trigger discharge of the lamp; and a circuit for energizing said lamp and grid, including a switch for closing the circuit.

2. In a flash unit for synchronous operation with a camera, the combination of: a housing having a lower forwardly directed longitudinal portion, an upper forwardly directed longitudinal portion spaced above said lower portion, and an upright handle portion interconnecting said two longitudinal portions; a concave reflector mounted on the forward end of said upper housing portion; an electric discharge lamp mounted centrally in said reflector; a circuit for energizing said lamp, including battery means in said lower housing portion and a main capacitor in said upper housing portion, the interior of said lower housing portion being accessible through one end thereof to receive said battery means; and pointed spring contact members mounted in the other end of said housing portion to cooperate with the terminals of said battery means to complete said circuit, the points of said contacts being directed towards said one end to be encountered by battery terminals when the battery means is inserted through said one end.

3. A combination as set forth in claim 2 in which said handle portion is rearwardly positioned relative to said longitudinal portions; and which includes an indicating lamp on said lower housing portion forwardly of said handle portion to signal readiness of said circuit.

4. A combination as set forth in claim 3 which includes a switch to ready said circuit, said switch having a hollow handle of light-transmitting material, said lamp being mounted in said handle.

5. In a flash unit for synchronous operation with a camera, the combination of: an electric discharge flash lamp; a battery means; a main capacitor; a neon indicator lamp, said flash lamp, battery, main capacitor, and indicator lamp being all connected in parallel to form a circuit for firing said flash lamp; an indicator network including said lamp and including a resistor and a second capacitor, both shunting said lamp; and a switch in said circuit to isolate one side of said flash lamp, one side of said capacitor, one side of said indicator lamp and one side of said network from the rest of the circuit.

6. A combination as set forth in claim 5 in which said switch has an operating knob and in which said indicator lamp is mounted in said knob.

7. In a flash unit for synchronous operation with a camera, the combination of: a forwardly directed concave reflector; an elongated generally horizontal rigid support mounted centrally in said reflector in a forwardly extending position approximately on the axis of the reflector; an elongated electric discharge lamp coiled around said support and wholly supported thereby with the turns of the lamp in direct contact with one longitudinal side of the support; and a spring extending along the other side of the support inside of the coil of the lamp in contact with multiple turns of the lamp coil and pressing outward on said multiple turns thereby creating pressure between the lamp coil and said one side of the support to prevent relative lateral movement between the support and the lamp coil in response to shock and vibratory forces.

8. A combination as set forth in claim 7 which includes a guard of light-transmitting material spanning said reflector, the periphery of said guard being connected with said reflector and the central portion of the guard being connected to the outer end of said support for reinforcement thereof; and which includes a colored disc of substantially smaller diameter than the guard positioned thereon substantially concentrically with said support for modifying the light emitted by said lamp.

9. A flash unit as set forth in claim 2 which includes means to mount a camera on the side of said lower portion of the housing whereby in the taking of a picture the camera may be supported manually by grasping said handle portion of the housing.

References Cited in the file of this patent

UNITED STATES PATENTS

| | | |
|---|---|---|
| 1,129,106 | Lightfoot | Feb. 23, 1915 |
| 2,096,856 | Nuchterlein | Oct. 26, 1937 |
| 2,365,812 | Friend | Dec. 26, 1944 |
| 2,399,222 | Germeshausen | Apr. 30, 1946 |
| 2,614,783 | Spear | Oct. 21, 1952 |
| 2,624,831 | Farber | Jan. 6, 1953 |
| 2,646,672 | Fairbank | July 28, 1953 |
| 2,697,390 | Kindelberger | Dec. 21, 1954 |
| 2,724,792 | Nessel | Nov. 22, 1955 |
| 2,731,577 | Floyd | Jan. 17, 1956 |
| 2,740,339 | Carter | Apr. 3, 1956 |
| 2,748,259 | Friedman | May 29, 1956 |
| 2,753,773 | Smith | July 10, 1956 |

FOREIGN PATENTS

| | | |
|---|---|---|
| 370,142 | Great Britain | Apr. 7, 1930 |